United States Patent
Johnson et al.

(10) Patent No.: US 9,430,541 B1
(45) Date of Patent: Aug. 30, 2016

(54) DATA UPDATES IN DISTRIBUTED SYSTEM WITH DATA COHERENCY

(75) Inventors: Archna Kalra Johnson, Cary, NC (US); Madhumita Vohra, Morrisville, NC (US); Paul Powell, Holly Springs, NC (US)

(73) Assignee: NETAPP, INC., Sunnyvale, CA (US)

(*) Notice: Subject to any disclaimer, the term of this patent is extended or adjusted under 35 U.S.C. 154(b) by 1174 days.

(21) Appl. No.: 12/432,570

(22) Filed: Apr. 29, 2009

(51) Int. Cl.
*G06F 7/00* (2006.01)
*G06F 17/00* (2006.01)
*G06F 17/30* (2006.01)

(52) U.S. Cl.
CPC .............................. *G06F 17/30575* (2013.01)

(58) Field of Classification Search
USPC .................. 707/999.201, 704, 636, 620, 623
See application file for complete search history.

(56) References Cited

U.S. PATENT DOCUMENTS

| | | | | |
|---|---|---|---|---|
| 5,434,994 A * | 7/1995 | Shaheen et al. | ............... | 709/223 |
| 7,702,683 B1 * | 4/2010 | Kirshenbaum | ............... | 707/758 |
| 2002/0124144 A1 * | 9/2002 | Gharachorloo et al. | ....... | 711/145 |
| 2003/0078946 A1 * | 4/2003 | Costello et al. | ............... | 707/201 |
| 2005/0010615 A1 * | 1/2005 | Cypher et al. | ................ | 707/201 |
| 2007/0288387 A1 * | 12/2007 | Park et al. | ....................... | 705/59 |
| 2008/0256299 A1 * | 10/2008 | Iyengar et al. | ............... | 711/124 |
| 2008/0294696 A1 * | 11/2008 | Frandzel | ....................... | 707/200 |
| 2009/0157761 A1 * | 6/2009 | Yanagida | ....................... | 707/201 |
| 2009/0300022 A1 * | 12/2009 | Little | .............................. | 707/10 |
| 2010/0332401 A1 * | 12/2010 | Prahlad et al. | ................ | 705/80 |

* cited by examiner

*Primary Examiner* — Alex Gofman
*Assistant Examiner* — Muluemebet Gurmu

(57) ABSTRACT

Updating data in a distributed system, in which a data coordinator receives a proposed change to a data element, locks the data element, and sends an invalidation command to nodes in the distributed system. If all nodes acknowledge the invalidation command, the data coordinator updates the data element locally and unlocks the data element. If not all nodes acknowledge the invalidation command, the data coordinator terminates the proposed change and unlocks the data element. Each node that invalidated the data element requests the data element. The data coordinator returns its current value. If the value is changed, all nodes request and receive the update. If a node did not invalidate, it will not request an update, but the value will not have changed so all requesting nodes receive the previous value. Thus, all nodes have the same value for the data element and consistency is maintained throughout the system.

22 Claims, 12 Drawing Sheets

DATA UPDATES IN DISTRIBUTED SYSTEM WITH DATA COHERENCY

FIELD

Embodiments of the invention are generally related to data coherency, and more particularly to data coherency among nodes of a distributed system.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2008, NetApp, Inc., All Rights Reserved.

BACKGROUND

Distributed systems may include multiple nodes storing copies of the same data locally at the nodes. In some distributed systems, there is a strong consistency requirement throughout the system, making it very important to ensure that all nodes operate on the same value of the data at all times. However, data updates and system failures may result in nodes having different values for the same data element, in contradiction of a requirement for consistency. Examples of distributed systems having consistency requirements may include data serving systems where multiple caches access the same storage. Each cache can be considered a node in the distributed system. With a consistency requirement, all nodes should see an update to a data element, or no node should see it. Further, a data element that is updated should not be made persistent (and thus available for reading) unless all nodes have been made aware of the update.

One approach to such consistency requirements in a distributed system is the known Two-Phase Commit Protocol. The Two-Phase Commit Protocol (2PC) is a blocking protocol that operates from two phases: a commit-request phase, and a commit phase. Briefly, the commit-request phase allows a controller or coordinator to prepare all participating entities for commit. The coordinator sends a query-to-commit message and waits for a reply from all entities. The entities execute the transaction, and write to a log that allows undoing the transaction. The entities then each reply with an agreement or abort message. If all entities agree, the coordinator sends a message to cause all entities to complete the transaction. If there is not complete agreement, the coordinator sends a message to cause all entities to undo the transaction. As will be understood by those skilled in the art, the implementation of 2PC suffers from many disadvantages, including that the implementation is complex, locks data for the entire period of time that coordination messages are exchanged, consumes bandwidth for the coordination messages, is subject to error if a system failure occurs during the commit phase, and requires robust network connections to work well.

SUMMARY

Updating data in a distributed system, in which a data coordinator receives a proposed change to a data element, locks the data element, and sends an invalidation command to nodes in the distributed system. If all nodes acknowledge the invalidation command, the data coordinator updates the data element locally and unlocks the data element. If not all nodes acknowledge the invalidation command, the data coordinator aborts the proposed change or terminates the proposed change as unsuccessful, and unlocks the data element. The data coordinator can be located at a central management device, or at one or more of the nodes of the distributed network. In one embodiment, the distributed database is a replicated database that is replicated and managed at each node of the network, and synchronized across the network.

Each node that invalidated the data element requests the data element. The data coordinator returns its current value. If the value is changed, all nodes request and receive the update. If a node did not invalidate, it will not request an update, but the value will not have changed so all requesting nodes receive the previous value. Thus, all nodes have the same value for the data element and consistency is maintained throughout the system. In one embodiment, each node of the distributed network includes a caching device.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
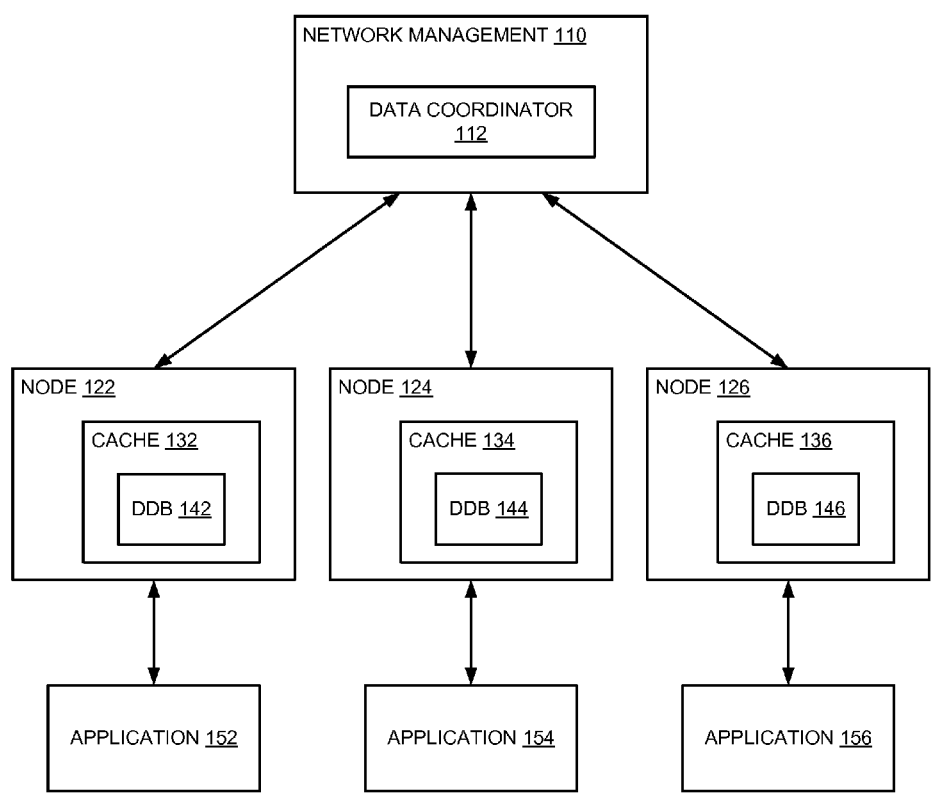
FIG. 1 is a block diagram of an embodiment of a distributed system that performs data updates with data coherency.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a distributed system maintains data coherency with data updating, even if system failures occur. A distributed system is a networked system of nodes or entities and data accessible by the nodes, where copies of an element of data may be in one or more nodes within the system. A node may be any type of computing device, such as a server, storage server, or other networked device that can cache a copy of an element of the data. The data element may be an atomic value within the system, for example, a 32-bit number in a 32-bit system, or a group of atomic values, for example, a file, data block, or array.

An example of a distributed system is a system of networked caches that provides access to data from a central store or database of information. The distributed system includes a data coordinator that processes requests to update data. The data coordinator may include hardware, software, or a combination. The data coordinator coordinates the update to the data, and performs operations that maintain data coherency throughout the distributed system. The data coordinator receives a proposed change to a data element and locks the data element to prevent other modifications of that data until the update transaction is completed or the process is aborted or terminated for that data element. The data coordinator sends an invalidation command to nodes in the distributed system. The invalidation command causes the nodes to invalidate copies of the data element that are local to the nodes. Each node should acknowledge the success of the local invalidate operation.

If all nodes acknowledge the invalidation command to the data coordinator, then no node within the distributed system has a valid copy of the data element. Furthermore, because the data element is locked, no access is allowed to the data element until the update transaction at the data coordinator is complete. The data coordinator updates the data element at the data coordinator, and unlocks the data element. All nodes then have invalid copies of the data element, and so will request the data element from the data coordinator at a subsequent time when attempting access to the data element. The data coordinator responds to requests for the updated data element by sending the updated value of the data element, which is the current value of the data element at the data coordinator because the update transaction was completed.

If not all nodes acknowledge the invalidation command, the data coordinator terminates the proposed change and unlocks the data element. When the update transaction is terminated unsuccessfully, the data element is rolled back to its previous value. Thus, the "current" value of the data element at the data coordinator is the previous or non-updated value of the data element when an abort occurs, which terminates the attempt to change the data element. For nodes that did not acknowledge the invalidation command, it can be assumed that the node did not invalidate the data element locally, and so retains a previous or non-updated copy of the data element. While nodes that failed to invalidate may not request the data element, the copy they retain locally is the previous value (the rolled back value), which will be identical to the value of the "current" value of the data element at the data coordinator. All nodes that did invalidate the data element will then have invalid copies of the data element and will therefore request the data element from the data coordinator. The value of the data element they receive from the data coordinator will be the previous value, which is the current value of the data element at the data coordinator. Thus, the copy of the data element will be "updated" to the previous value for the nodes that did invalidate. In this manner, all nodes that have valid copies of the data element will have the same value for the data element at all times.

It will be appreciated that if a system failure occurs at any point, there will still be data consistency. If the data coordinator fails, during the update transaction, it will re-initialize with the previous value—thus, nodes that did not invalidate will have the same value as the data coordinator for the data element, and those that did invalidate will be "updated" with the previous value. If a node fails during a request for acknowledgement, it will fail to acknowledge, causing a state where not all nodes acknowledged, as mentioned above.

In the following description with more particular reference to the figures, various figures include reference to elements or components having the same or similar descriptors. Where the same or similar descriptors are used, it will be understood that the illustrations in the various figures and accompanying descriptions may describe additional details and/or alternatives with respect to those elements or components having the same or similar descriptors, even where different reference numbers are used.

FIG. 1 is a block diagram of an embodiment of a distributed system that performs data updates with data coherency. System 100 is a distributed system with nodes 122, 124, and 126. Each node can be a server, storage server, or data caching appliance on a network or other device that processes requests to access data elements of a data store, such as a database or element of a storage system. Each node can include a cache having some or all elements of the data store. As used herein, the data store may be referred to as a database, which is understood to be any data structure or mechanism of structured data management. Thus, each node may be or include a data cache, as illustrated by caches 132, 134, and 136 of nodes 122, 124, and 126, respectively. The nodes of a system such as system 100 are frequently referred to as "cohorts" or "cohort nodes," or "cohort caches." From one perspective, "nodes" can be understood more generally to refer to all entities on the distributed network that may participate in an update coordination as described herein. "Cohorts" may be understood to specifically refer to nodes that participate in a particular group and will be updated together. For example, a cohort may refer to a node that caches data, whereas another node may not cache data, and thus not be in the cohort. As another example, multiple databases may be distributed through a network, and certain nodes cache one database but not another. Thus, not all nodes will include all the same data elements, and updating may be specific to a group or set to which a node belongs.

In one embodiment, one or more of nodes 122, 124, or 126 is a storage server with caching that has a distributed architecture. A storage server having a distributed architecture can be implemented with multiple distributed storage servers. The distributed architecture may include physically separate network modules ("N-modules") and data/disk modules ("D-modules") (not shown). The separate modules may communicate with other storage servers, and with a data coordinator for purposes of cache coherency, over an external interconnect. The N-module acts as a front-end of the storage server, exporting services to clients, while the D-module acts as a backend, managing the underlying storage of the storage server. The N- and D-modules can be contained in separate housings and communicate with each other via network connections. Thus, the N-module and the D-module enable a storage server to be physically separated into multiple modules that can be distributed across a network, where individual modules can be added according to need (e.g., add more N-modules for a very active front-end, or more D-modules for heavy data access/processing operations), in a modular fashion.

For purposes of example in description, it will be assumed that nodes 122-126 access data elements of a database.

Consider a distributed database that is shared among the nodes, with local copies DDB 142, DDB 144, and DDB 146 of nodes 122, 124, and 126, respectively. In one embodiment, nodes 122-126 represent a cluster of caches.

System 100 includes network management 110, which is or includes a data coordinator or controller in the distributed system. For the specific example shown, network management 110 includes data coordinator 112, which coordinates updates to the distributed database. Thus, requests to update a data element within the distributed database are processed at data coordinator 112. In one embodiment, data coordinator 112 is a central management entity within system 100, such as a standalone device in the network that handles administrative or management tasks. In an alternate embodiment, data coordinator 112 may be part of or be a node within the distributed system that acts as a management entity. Thus, the data coordinator can be implemented, for example, on an administrative server or workstation, or it can be part of any node of the network. The data coordinator can include hardware and software components for coordinating the update and coherency of data in system 100. Data coordinator 112 could also be referred to as a "database coordinator." The specific label given to the coordinator may be changed, and it will be understood that the coordinator coordinates data updates and/or data coherency.

Each node 122, 124, and 126 may provide access to the distributed database, for example, by servicing requests originating from user applications, such as applications 152, 154, and 156, respectively. Each node may receive requests from more that one application, or more than one user through a single application.

Data coordinator 112 and the distributed nodes coordinate data updates to the distributed database in accordance with the techniques described herein. The techniques for data update coordination described herein are unique in their implementation, and do not require the update transactions and rollbacks at each individual node, such as is required by 2PC (the Two-Phase Commit Protocol). Rather, updates and rollbacks occur within the data coordinator. The techniques described herein have lower bandwidth requirements for the updating, which can offset the increase in bandwidth required for each node that invalidated a data element to request an update of the element from the data coordinator. The techniques described herein are also simpler and provide a simpler, more elegant coordination approach as compared to 2PC. The lock times may be reduced because the update and roll back is only performed at the data coordinator, reducing the number of operations in the system that need to be performed during the lock.

While described above with specific reference to the example of system 100, it will be understood that the techniques described herein for data update management are not limited to a particular network configuration or architecture, other than being a distributed system of networked elements storing distributed data. In general, the techniques described herein could be referred to as a data coherency protocol or data updating with coherency, or some other phrase. The coherent updating is understood as multiple operations, whether a sequence or a set of operations or processes or functions. The coherent updating can be referred to as coordination operations. The coordination operations enable distributed environments to atomically update data in a database and multiple caches on the nodes in the environment. For an update to a data element that must be made persistent in the data store, as well as propagated to the caches, the coordination operations guarantee that the data store and the caches will have a consistent view of the data.

The operations are described generally for a distributed system with multiple nodes where there is a database whose elements are cached in the nodes. The database is managed by a data coordinator (e.g., data coordinator 112). Elements of the database can be pushed into caches on the cohort nodes (e.g., caches 132, 134, and 136 of nodes 122, 124, and 126, respectively). It is not necessary for the nodes to communicate with each other to implement the update coordination described herein, but they may communicate with each other. They must communicate, either directly or indirectly to the data coordinator. In one embodiment, some nodes will receive an update and others will not. The nodes can be grouped in sets of cohorts. The start of the update operation may thus include defining what nodes that will receive the update. The defining of what nodes will receive the update may include identifying or determining what nodes should receive an invalidation message or request. Such identifying can be performed by storing tables of what nodes should be included for particular data elements or node groups (e.g., a group of cohorts, where different cohort groups may be defined for different data or different data types).

In one embodiment, the coordination operations are implemented to support having multiple readers and writers of the data managed by the data coordinator. In such an implementation, it is possible for nodes that are not in the cohort set to issue reads for the data.

Updating a data element of the database can include modification of the value of the data element, or removal of the data element from the system, e.g., through a data change and database write or commit. The database commit may be delayed until the data coordinator has received an invalidate acknowledgement from all cohort nodes. Note that the creation of a new data element in the database can be viewed as a modification of a data element that is absent in the cache. Thus, the data element is created in the cache and marked invalid. Making a data element invalid may include changing a state of the data element within the cache. Changing the state of the data element can be performed in any known manner, such as by modifying a field of a cache entry, or modifying a valid/invalid table. Regardless of whether an update is for modification or removal, the update according to the mechanisms described herein ensures that either all the cohorts in the set receive the new value or no cohort receives the update. Thus, the coordination operations ensure cohort caches will be coherent across network outages and failures to write to the database itself, as described above. Nodes that read the data, whether in the cohort set or not, will have the same view of the data as the cohorts.

In one embodiment, the coordination operations may assume that the database management provides ACID guarantees (Atomicity, Consistency, Isolation, Durability), and the coordination operations merely ensure coherency of the data for the transactions. Those of skill in the art will understand that atomicity refers to ensuring that all aspects of a transaction are performed or none are, consistency refers to ensuring that the database remains in a consistent state that applies by the database rules throughout the transaction, isolation refers to ensuring that other operations cannot access data in an intermediate state of a transaction, and durability refers to ensuring the transaction persists once an indication of success of the transaction is send to participants.

Note that for the sake of simplicity in description, the coordination operations are described with reference to a database on a single node of the network, which has the data coordinator, and to which all other nodes communicate to access a data element. The coordination operations also function in an environment where the database is replicated on multiple nodes. In a replicated database implementation, each node includes a copy of the database, and may include a data coordinator. The cohort caches can thus communicate with a data coordinator on their own node, and the updates are distributed.

In one embodiment, a data element stored at a node (e.g., in a cache) can take one of two defined states: valid or invalid. A valid state means the data element is available for reading/access, and the value of the data element at the cache is the same as that in the database. An invalid states means the data element is not valid to satisfy a read/access request. An invalid state does not necessarily mean that the value is different from the value in the database, but that the value might not match the one in the database, and must be refreshed from the database by issuing a read request for the data coordinator.

Figure 3A:
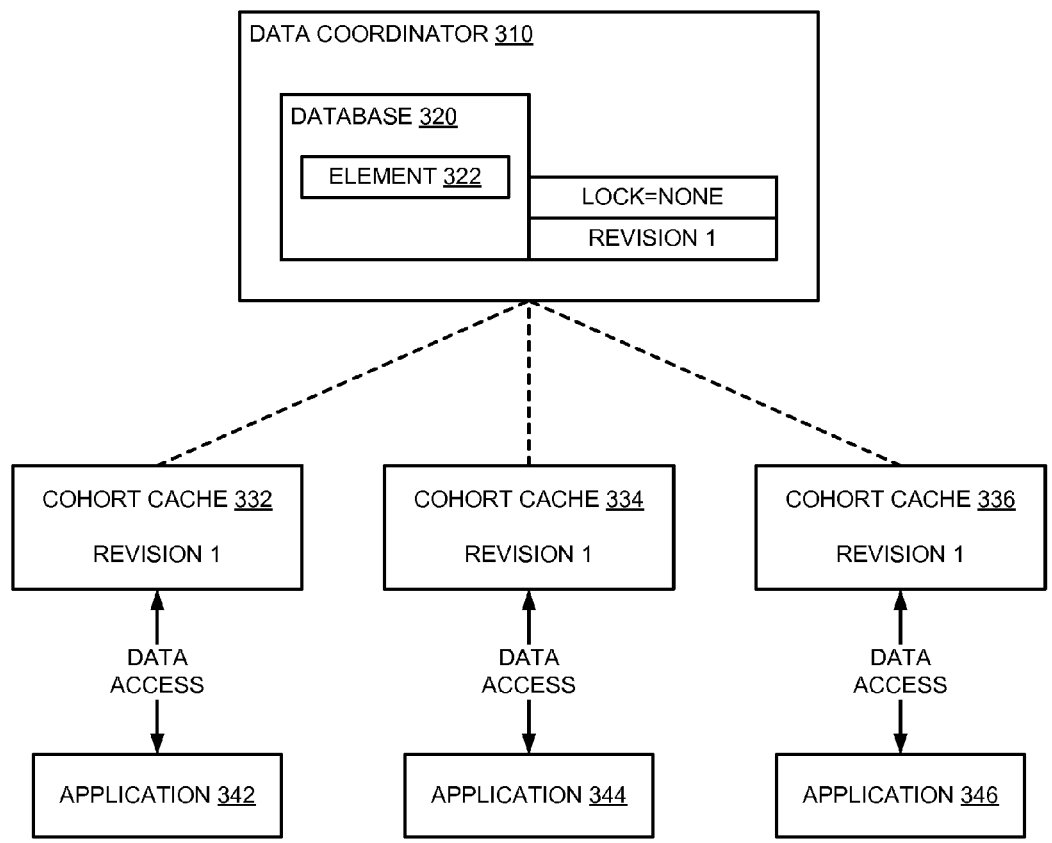
FIGS. 3A-3G are block diagrams of an embodiment of a series of states of a distributed system that performs data updates with data coherency.
Figure 3B:
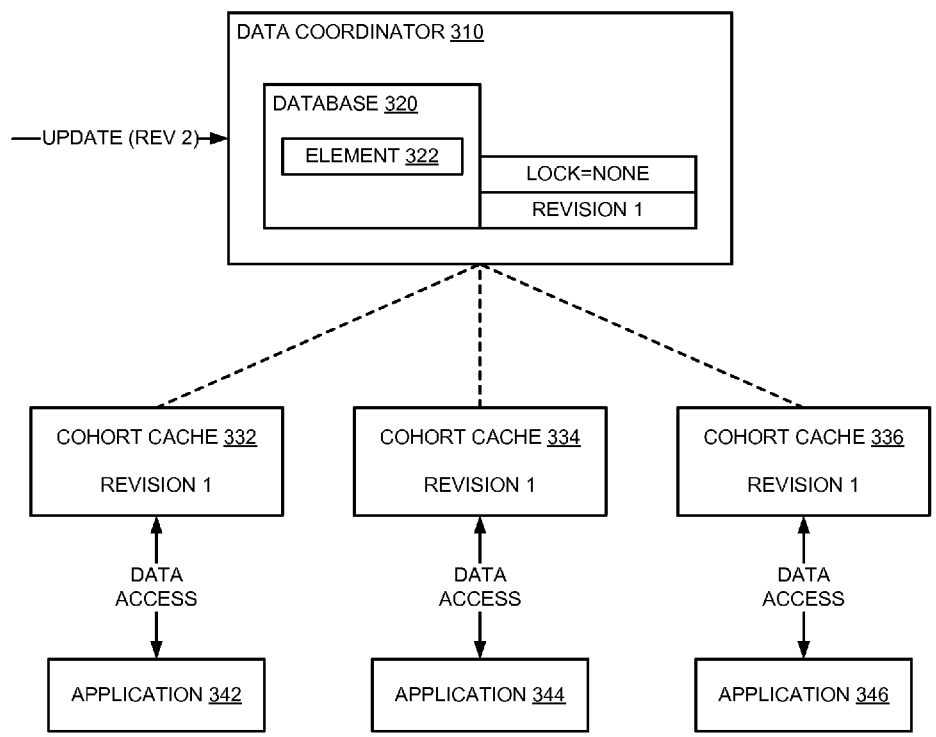
Figure 3C:
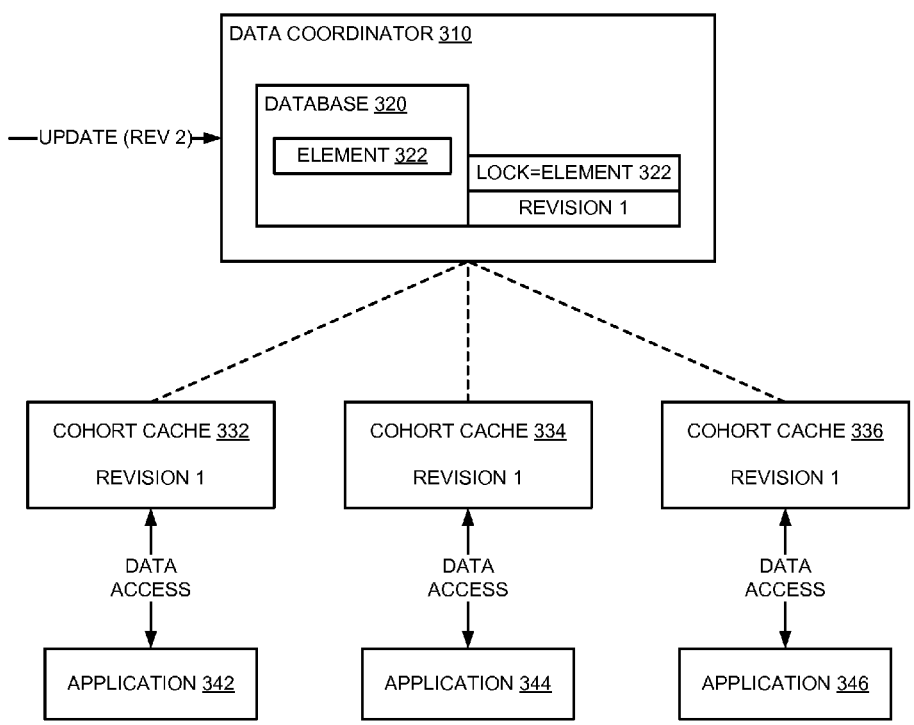
Figure 3D:
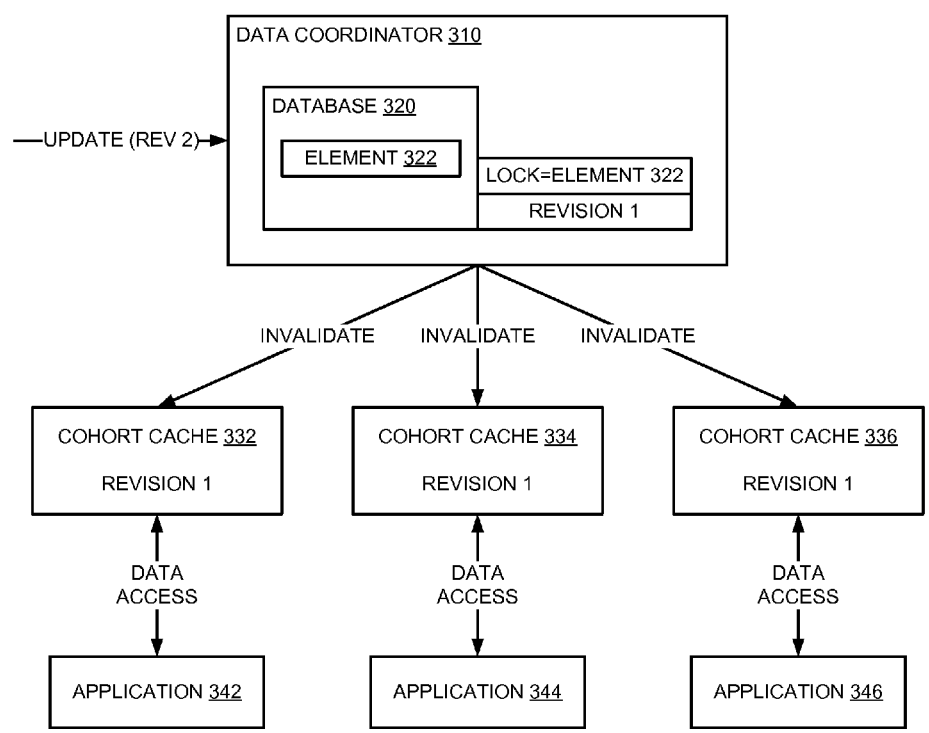
Figure 3E:
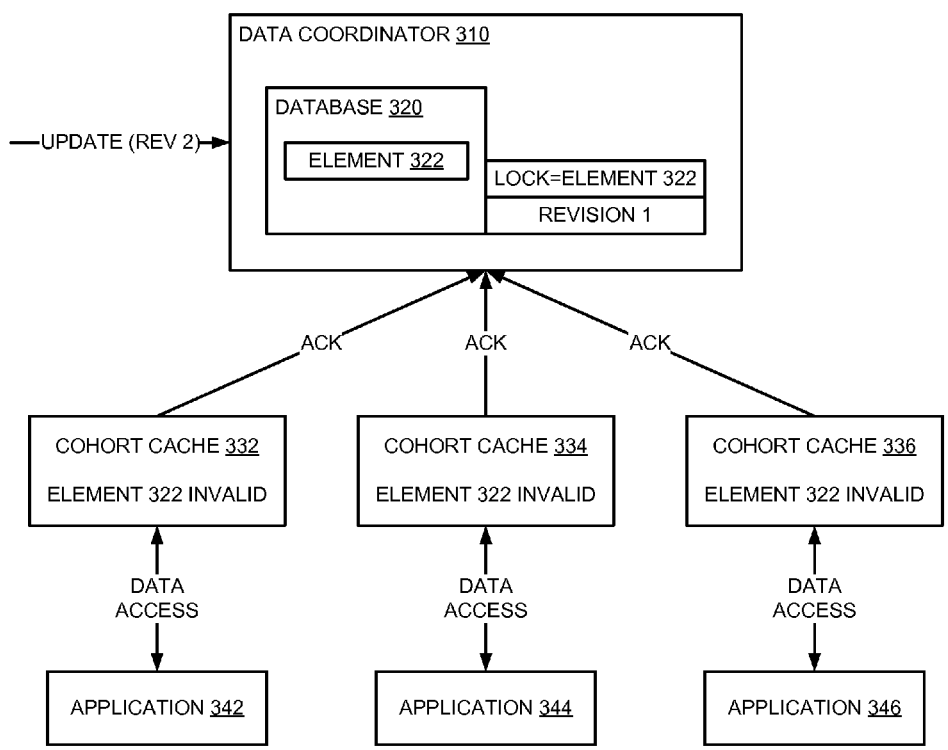
Figure 3F:
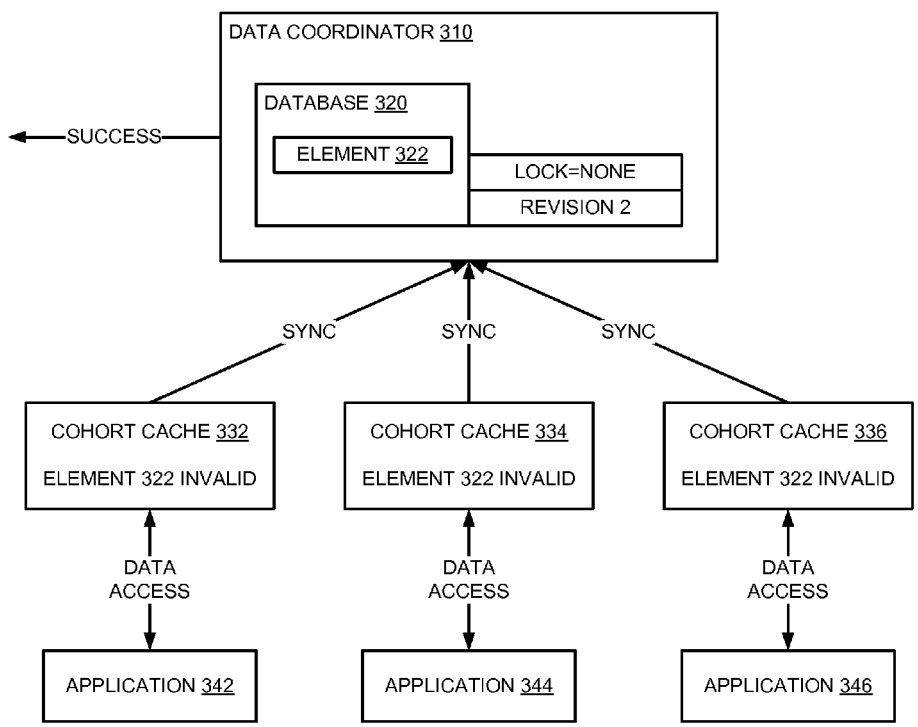
Figure 3G:
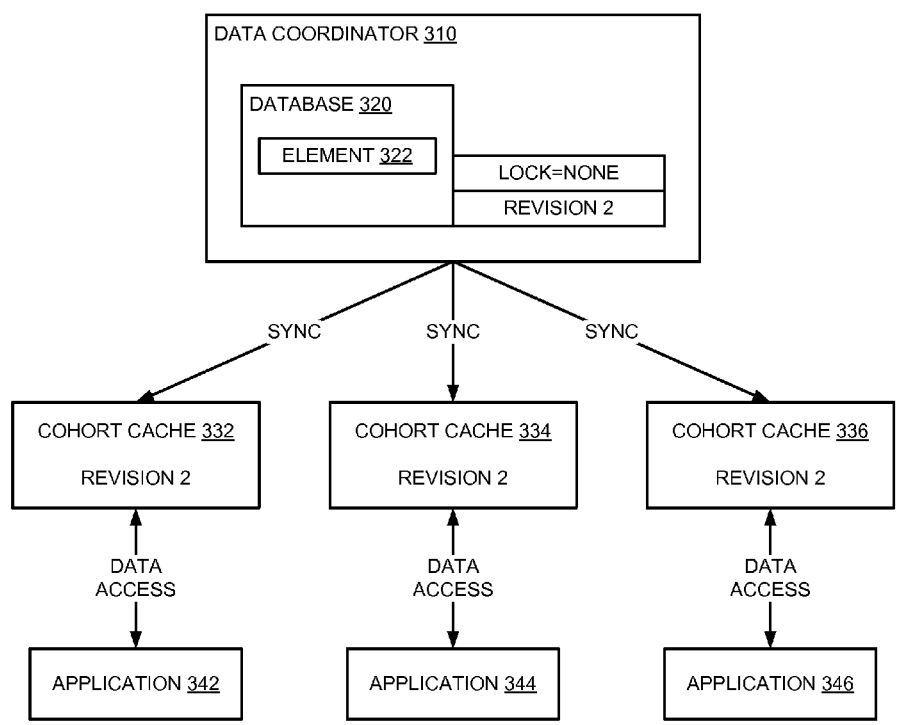
Figure 4A:
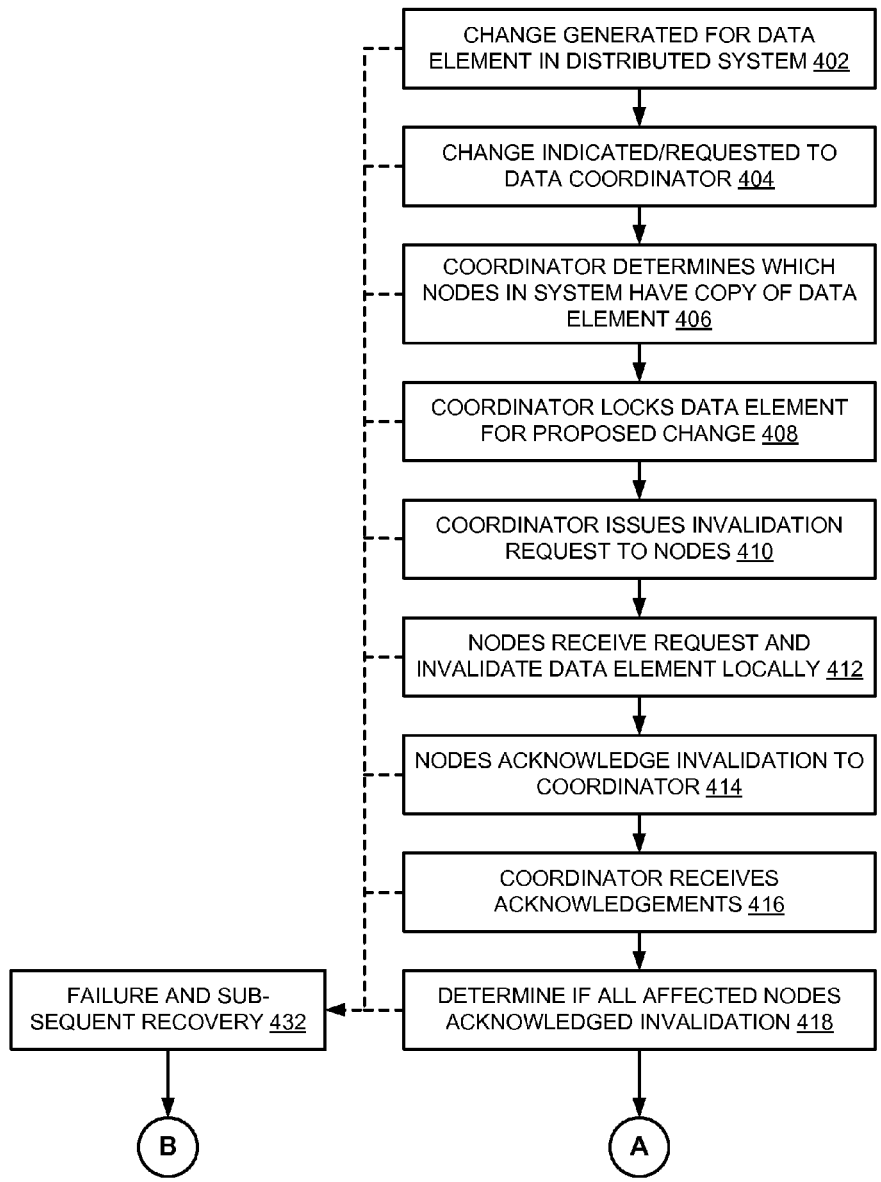
FIGS. 4A-4B represent a flow diagram of an embodiment of a process for updating data in a distributed system.
Figure 4B:
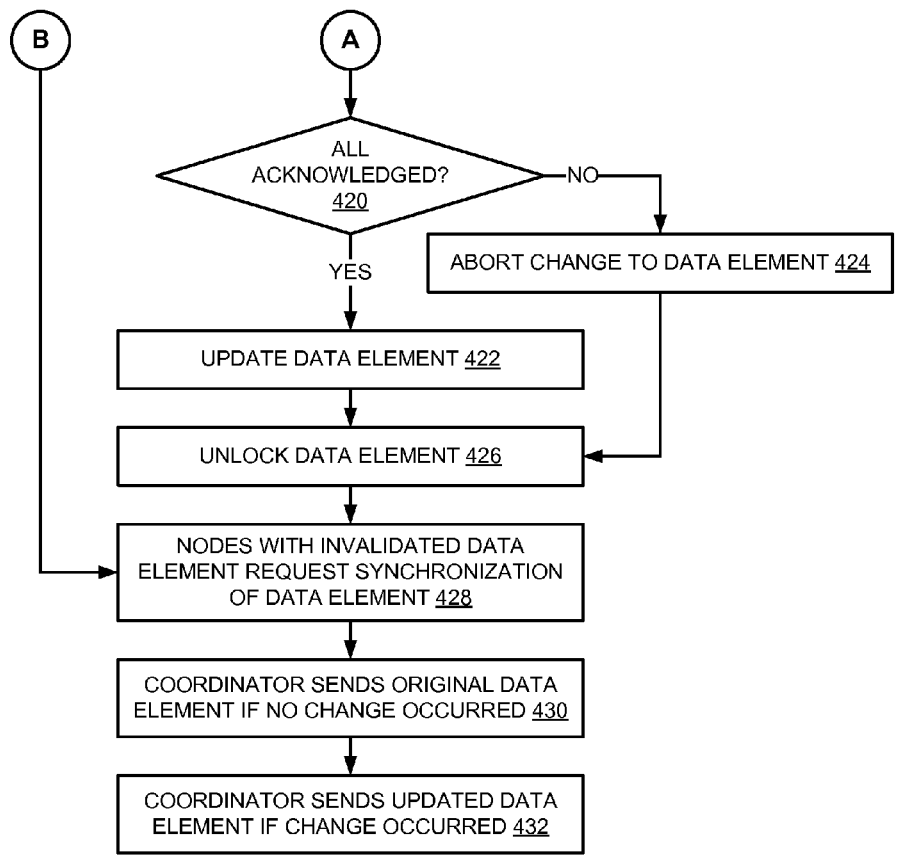

The flow or operation of the coordination operations are described briefly above, and are described in more detail, for example, with reference to FIGS. 4A-4B. FIGS. 3A-3G provide an illustration of the state of the data coordinator and cohorts through a flow of a data element update in accordance with the coordination operations.

Figure 2:
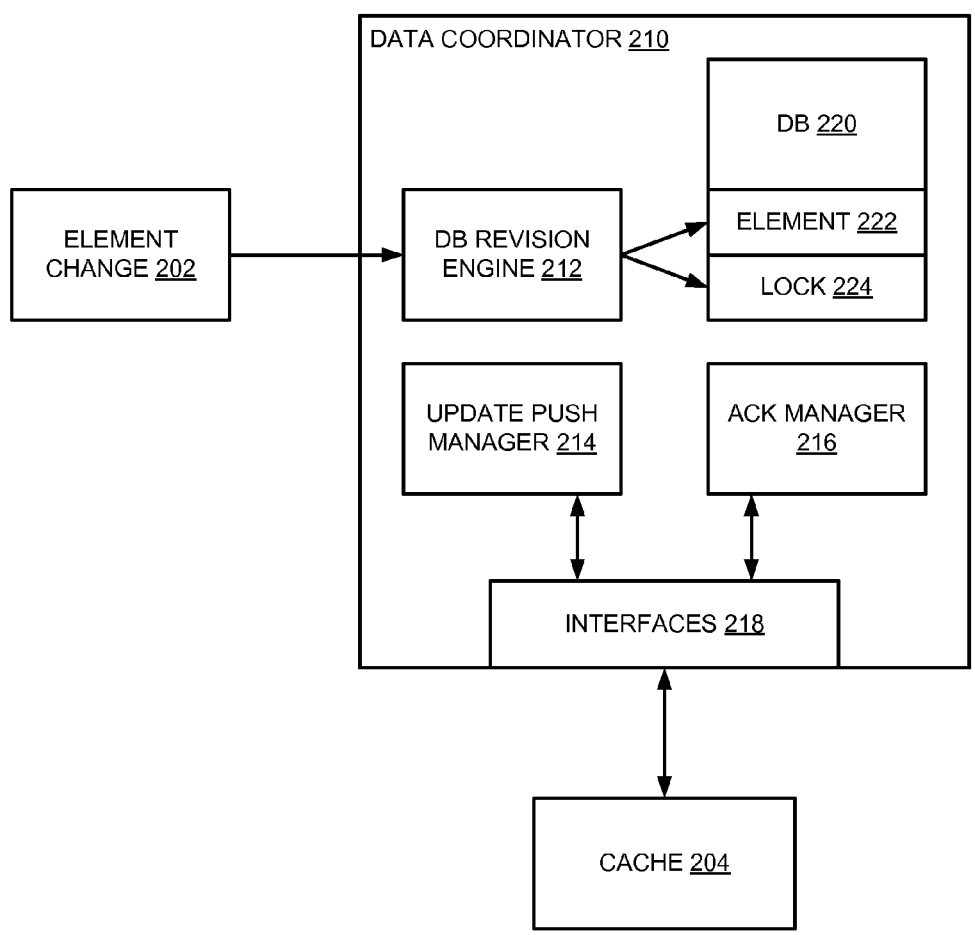
FIG. 2 is a block diagram of an embodiment of a data coordinator of a distributed system that performs data updates with data coherency.

FIG. 2 is a block diagram of an embodiment of a data coordinator of a distributed system that performs data updates with data coherency. System 200 is a distributed system in accordance with any embodiment described herein, for example, system 100 of FIG. 1. System 200 includes data coordinator 210, which is a data coordinator according to any embodiment described herein. (tie the data coordinators to FIG. 1) As mentioned above, data coordinator 210 could be a component of a central management entity in a network of system 200, or could be a data coordinator located on a node of a distributed system implementation having a replicated database. The operations of the data coordinator will be basically the same in either scenario. As an overview, the data coordinator receives requests for modification or deletion of a data element, locks the data element, and exchanges messages with nodes of the system affected by the request (e.g., cohorts).

Data coordinator 210 receives element change 202, which represents a modification or change to a data element. The change can be generated from either user activity, such as through a user application that interfaces with system 200, or through an administrative change, such as through management software. The change could also occur through an automated system or module within system 200 that causes a change to data. Data coordinator 210 is coupled with cache 204, which represents one type of data consumer with which the data coordinator coordinates element change 202. Cache 204 can be directly or indirectly coupled to data coordinator 210.

Data coordinator 210 is illustrated with various components, which may include functional component, or functional modules. Data coordinator 210 is illustrated with database (DB) 220, which represents the data store to which one or more data elements 222 belong. Note that the perspective that data coordinator 210 including database 220 is conceptual from the operational perspective. The database is within the control or management of data coordinator 210. From a different perspective, such as an architectural diagram, data coordinator 210 could be considered to be "within" database 220, or both could be considered to be separate items, neither "within" the other. Thus, it will be understood that the diagrams are merely representative of a perspective of the network, and other perspectives can be understood from the discussion.

As mentioned, database 220 represents the data store having element 222, which for purposes of example is the data element that is the subject of element change 202. Lock 224 represents any mechanism used by a data store or data store manager to lock a data element from access. When lock 224 is active with respect to element 222, the data element cannot be read or written. Data coordinator 210 includes database revision engine 212, which receives element change 202 (a request), identifies element 222, and locks the element.

Data coordinator 210 includes update push manager 214 and acknowledgement (ack) manager 216. Update push manager 214 enables data coordinator 210 to push a command to nodes of the distributed system to invalidate copies of element 222 stored locally at the nodes, for example, at cache 204. In one embodiment, update push manager 214 is configured with addresses or identifiers of nodes within the network. The configuration can be dynamic or controlled by an administrator. The identifiers can be included in a list, data structure, or other form. In one embodiment, nodes register with update push manager 214. In another embodiment, update push manager 214 sends messages to all nodes coupled to it. In one embodiment, data coordinator tracks what nodes have particular data elements or data blocks or groups of data. The messages for updating data can be limited to those nodes affected, which could be all nodes in one configuration, all cohorts, or only those identified as having the data. Note that tracking what nodes have what data can be costly. Thus, an implementation of such a system with tracking will be better suited for small implementations with only a few nodes in the distributed system, or in systems where bandwidth constraints are outweighed by processing and storage capabilities in the system.

Update push manager 214 sends a command or message to request invalidation of a data element at a node of the network. The invalidation request may also simply be referred to as "an invalidation." The nodes may mark a local copy of the data element invalid, and request a refresh or update of the data element from the data coordinator prior to any use or access of the data element at the node.

Acknowledgement manager 216 enables data coordinator 210 to manage the acknowledgements received from the cohorts. In particular, acknowledgement manager 216 enables data coordinator 210 to track what nodes have acknowledged an invalidation request, and whether all nodes have so acknowledged. As set forth in more detail at other places herein, completion of a change transaction will only take place if all cohorts acknowledge the invalidation, which indicates the data element has been invalidated at the node. When not all nodes acknowledge, acknowledgement manager 216 causes data coordinator 210 to terminate the proposed change.

Interfaces 218 is an abstraction representing any type of ports, hardware and software, drivers, components, network stacks, protocols, etc., to communicate with nodes of the distributed network.

Based on the description of the invalidation requests and acknowledgements, as well as the general description of the update coordination above, it will be understood that aborting or terminating the proposed change does not require the data coordinator to send additional messages or do anything with respect to the copies of the data element at the nodes once invalidation has been requested. Thus, when the data coordinator terminates the proposed change, it can leave the data element invalid at any node that invalidated the data element, until the node requests a refresh or synchronization of the data element. Because the data element is invalid at the node, the node will not use the invalidated data element value. Rather, prior to completing access to the data element, the node requests the data element from the data coordinator and receives the current value of the data element. The data coordinator can thus simply terminate the proposed change and await requests from the nodes for the updated data element. Even if system errors occur and one or more nodes is temporarily lost, the only nodes having a valid copy of the data element will have the same value as the current value of the data element at the data coordinator. Upon receiving a request from a node that invalidated the data element, the data coordinator can send the current value of the data element to the node.

FIGS. 3A-3G are block diagrams of an embodiment of a series of states of a distributed system that performs data updates with data coherency. Data coordinator 310 is an example of a data coordinator or data coordinator according to any embodiment described herein. Cohort caches 332, 334, and 336 represent examples of cohort nodes within the distributed system. Data coordinator 310 includes database 320 having element 322. A lock and a revision designator are associated with the database or with element 322.

For purposes of the description of the following figures, consider that Revision 1 is a revision of the database that has a particular value for element 322, and Revision 2 is a revision having an updated value for element 322. FIG. 3A illustrates an initial state of system 300. The initial state is the state of the system just prior to the request to update element 322. The duration of the initial state shown may be as little as a fraction of a second as changes to data occurs in the operation of system 300. Cohort caches 332, 334, and 336 provide data access to applications 342, 344, and 346, respectively.

FIG. 3B illustrates a state of system 300 during a request to update element 322. Nothing is changed with respect to the cohort caches and applications, but data coordinator 310 receives Update (Revision 2) requesting an update to element 322. FIG. 3C illustrates a state of system 300 after receiving the update to element 322. Data coordinator 310 locks element 322, as shown by the block Lock=element 322. Additionally, data coordinator 310 generates an invalidation request that it sends to cohort caches 332, 334, and 336, as illustrated in FIG. 3D. In response to the request, each cohort cache invalidates element 322 locally, as illustrated in FIG. 3E. In addition to invalidating their local copies of element 322, each cohort cache sends an acknowledgement (ACK) to data coordinator 310 to indicate that the invalidation was successful with respect to the sending node. Note that Update (Revision 2) is still pending until the update transaction is either completed or terminated. Thus, the update request continues to be shown in figures beyond FIG. 3B. Also note that a scenario where all nodes acknowledge is illustrated, but as described in other places herein, a node might fail to acknowledge. If a node fails to acknowledge, for any reason, in one embodiment, the update is terminated.

FIG. 3F illustrates a state of system 300 after the cohort caches have invalidated element 322 locally, or at each individual cache itself. After each cohort cache has acknowledged the invalidation, data coordinator 310 completes the update transaction, causing database 320 to become Revision 2, having the updated value of element 322. The update transaction can then be reported as successful. Data coordinator 310 also releases the lock on element 322. Because each cohort cache invalidated element 322 locally, each cohort cache needs to synchronize the value of element 322 with data coordinator 310, as shown by the "Sync" arrows. Note that the cohort caches do not all necessarily request synchronization at the same time. In one embodiment, a cohort cache only requests synchronization or refreshing of element 322 when its associated application requests the data element. The cohort caches may not be able to request an update of element 322 until data coordinator 310 releases the lock on the element.

FIG. 3G illustrates a state of system 300 where data coordinator 310 synchronizes the cohort caches with respect to element 322. Each cohort cache that has been updated will then have Revision 2. As mentioned above, it will be understood that not all cohort caches need necessarily be updated simultaneously or substantially simultaneously, but could be updated at significantly different times. However, for purposes of using element 322, each cohort will eventually request synchronization, and receive an update from data coordinator 310.

FIGS. 4A-4B represent a flow diagram of an embodiment of a process for updating data in a distributed system. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

A user causes a system to generate, or an automated system or component of a system generates, a change for a data element stored in a distributed system (e.g., system 100 of FIG. 1, system 200 of FIG. 2, system 300 of FIG. 3), 402. The change is indicated or requested to a data coordinator (e.g., 112 of FIG. 1, 210 of FIG. 2, 310 of FIG. 3) that coordinates changes within the distributed system, 404. The change request can be received as an operation of the form update_element(element, new_value). The request for a change can occur through one of the nodes of the distributed system, for example, through an application that accesses the node. In one embodiment, the data coordinator tracks what nodes are affected by changes to particular data elements, and thus, may determine which nodes (e.g., 122, 124, 126, 204, 332, 334, and 336) have a copy of the data element, 406. The data coordinator may thus only provide update messages to those nodes.

Before an element can be updated in the database, the data coordinator locks the data element, 408. The lock blocks any read or write operation for the data element from the database. Locking can be performed in any manner known in the art, such as through the use of lock tables, flagging a particular data element (e.g., adding a bit, changing a "valid" field, etc.), modifying a status or state of a reference representing the data element, etc. The data coordinator issues an invalidation request to the nodes (which may be the nodes determined to be affected), 410. The invalidation request may be a command of the form invalidate_element(element). The invalidation request can be considered a "push" operation.

The nodes receive the invalidation request by the data coordinator and invalidate the data element locally, 412. In one embodiment, invalidating the data element includes marking the data element as invalid. In one embodiment, the invalidation request causes the nodes to perform an operation to invalidate the data element, which may be similar mechanisms as for locking a data element, such as using a valid/invalid table, flagging a data element, changing a field or a reference for the data element, etc. In the event that a node fails to receive the command due to a failed network link, or a failure of the node itself, it may fail to perform the invalidation. Such a failure to perform the invalidation is addressed in more detail below. The nodes that received the invalidation request acknowledge the invalidation (send an ACK or other message or communication) to the data coordinator, 414. The data coordinator receives all acknowledgements, 416. The data coordinator determines whether an acknowledgement is received from all nodes to which the invalidation was sent, 418. Determining whether an acknowledgement or an acknowledge message is received from all nodes can include keeping counters to indicate the number of messages send and received and comparing the two, comparing a node identifier received in an acknowledgement to a list of nodes to which the invalidation request was sent, or through another mechanism.

It will be understood that at any time during the operations represented by 402-418, a failure could occur within the distributed system. The failure could be an error on the part of one or more nodes, a communication failure, etc. If a failure occurs, the affected node, nodes, or the whole system enter a failure and recovery. Thus, failure and subsequent recovery may occur at any point in time, 432. Such a possibility of failure is one defect in the 2PC protocol, which may not recover coherently from the failure. In contrast to protocols that may not provide coherent recovery, note that at all times the data stored at the nodes will match the data at the data coordinator if the data is valid.

If the data coordinator receives an acknowledgement from all cohort nodes, 420, the update operation can proceed to update the element in the database, 422. If there are cohorts that do not respond with an acknowledgement, the data coordinator terminates (e.g., rolls back) the update operation, and thus terminates the change to the data element, 424. The element is not modified in the database (e.g., no commit was performed), and so all nodes refreshing the data element from the data coordinator will receive the unmodified value.

After changing the value of the data element or terminating the change operation, the data coordinator unlocks the data element, 426. The update or change operation is successful if the data element is made persistent in the database after the receipt of acknowledgements from all cohort nodes. The data coordinator indicates the success of the change operation to the requestor. Releasing the lock makes the data element available for updates and reads. If the change operation was completed, the data element has a new value, which is written to the database prior to releasing the lock.

The nodes with an invalidated copy of the data element will request synchronization of the data element, 428. When the cohort nodes receive a request to access the element in the cache, the cohorts determine that the data element is marked invalid, and refresh the caches by issuing a read for the element from the database. Once the current value of the database (the value at the data coordinator) is received, the data element can then be marked valid at the nodes. The process of waiting for the nodes to request a refresh of the data element can be considered a lazy pull operation. If the update was terminated, the change did not occur and the data coordinator sends the original data element, 430. If the update was successful, the value of the data element is changed, and the data coordinator sending the update data element, 432.

As mentioned above, the system maintains data coherency in failure scenarios. In a first failure scenario, the data coordinator does not receive acknowledgements from all the cohorts in the distributed system. The update operation is simply terminated and the element retains its old value in the database. Note that in the event of network outages, it is possible that only some nodes in the cohort set marked the element invalid. The cohorts can be configured to always perform a lazy pull, which is that they check the state of the data element when a request for the data element is received. If the data element is marked invalid, the cohort issues a read request from the database and refreshes its cache. The data element is then marked valid and its value is the same as that in the distributed database.

In another failure scenario, the data coordinator receives acknowledgements from all the cohorts, and then attempts to update the data element in the database but fails. In such a scenario, the data coordinator can release the lock on the data element. The data element retains its old value in the distributed database. All cohorts that marked the data element valid (all of them if all acknowledged) will refresh their caches for the data element. The refresh will reflect the old value of the data element upon a read request at the cohorts. If there are cohorts that did not mark the data element invalid, the value of the data element in their caches matches that in the database, which makes it valid and available for a cache read. Thus, coherency is maintained even in failure scenarios.

Figure 5:
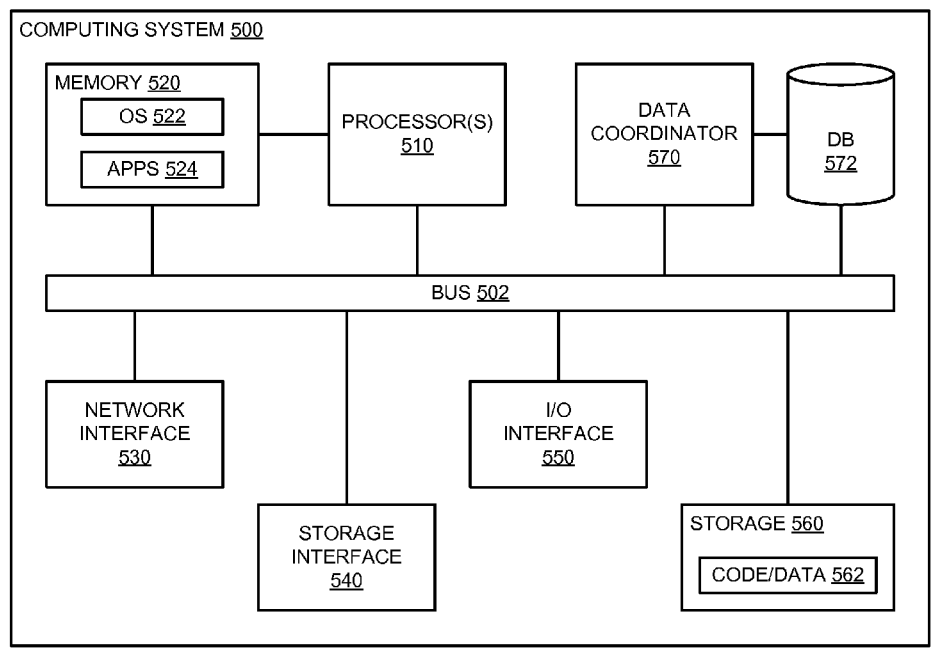
FIG. 5 is a block diagram of a computing system that is a node on which embodiments of the invention can be implemented.

FIG. 5 is a block diagram of a computing system that is a node on which embodiments of the invention can be implemented. Computing system 500 represents a system that could function as a node within a distributed network (e.g., node 122 of FIG. 1) and/or a device in a distributed system that incorporates a data coordinator (e.g., data coordinator 210 of FIG. 2). Computing system 500 may be a storage server device, a data caching network device, or another device within a network that can incorporate a data coordinator to coordinate data coherency and/or data updates in the network. Computing system 500 is depicted with various components that may be present in whole or in part, and additional components or subcomponents may also be present. Computing system 500 includes one or more processors 510, which executes instructions and may perform various operations as described herein. Processor 510 may include any type of microprocessor, central processing unit (CPU), processing core, etc. Processor 510 controls the overall operation of the computing system 500, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 520 represents the main memory of the computing system 500, and provides temporary storage for code (e.g., software routines or series of instructions, commands, operations, programs, data, etc.) to be executed by processor 510. Memory 520 may include read-only memory (ROM), flash memory, one or more varieties of random access memory (RAM), or the like, or a combination of such devices. Memory 520 stores, among other things, operating system (OS) 522 that acts as a software platform, and applications (apps) 524, which enable user interaction and/or interaction among software components.

The various components of computing system 500 are coupled to bus 502. Bus 502 is an abstraction that represents any one or more separate physical buses, communication lines, and/or point-to-point connections, connected by appropriate bridges, adapters, and/or controllers. Therefore, bus 502 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Computing system 500 includes network interface 530, which represents hardware and software (e.g., drivers) that enable computing system 500 to communicate with remote devices (e.g., clients) over one or more networks as described herein. Processor 510 may execute various network stacks to control interfaces to various networks through network interface 530. Computing system 500 may include storage interface/adapter 540, which enables computing system 500 to access attached storage (e.g., a storage area network or other storage subsystem) and may be, for example, a Fibre Channel adapter, a SCSI adapter, etc. Computing system 500 includes one or more input/output (I/O) interface(s) 550, which may include one or more interface components to connect with other electronic equipment, for example, custom connections, blade adapters, etc. Additionally, I/O interfaces 550 can include video, audio, and/or alphanumeric interfaces through which a user interacts with computing system 500. Computing system 500 may include one or more internal storage device(s) 560. Storage 560 can be any conventional medium for storing large volumes of data in a non-volatile manner, such as magnetic, optical, and/or semiconductor-based disks. Storage 560 may hold code and/or data 562 in a persistent state (i.e., the value may be retained despite interruption of power to computing system 500).

In one embodiment, computing system 500 includes data coordinator 570, which is an abstraction to represent components (software and/or hardware) that enable computing system 500 to coordinate data changes as described herein. Data coordinator 570 may thus operate in conjunction with components in memory 520 for execution on processor 510, and/or with network interface 530 to communicate with users and/or nodes of the distributed network. Computing system 500 also includes database 572, which represents components of a distributed database that are stored (e.g., in a cache) locally at the computing system. Database 572 may represent some or all of the database. Thus, not all data elements of the distributed database are necessarily stored in all nodes of the distributed network, and not all nodes necessarily cache or store the same data elements.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   receiving by a device incorporating a data coordinator a proposed change to a data element of a distributed system, the distributed system having multiple nodes storing a copy of the data element, each node coupled to, and in communication with, the data coordinator;
   locking the data element at the device to prevent access to the data element in response to receiving the proposed change;
   sending, after locking the data element at the device, an invalidation of the data element to the nodes of the distributed system storing a copy of the data element to invalidate copies of the data element stored at the nodes;
   receiving, by the device, any acknowledgements of the invalidation sent by the nodes storing a copy of the data element;
   updating the data element in accordance with the proposed change if all nodes in the distributed system storing a copy of the data element acknowledge the invalidation of the data element, otherwise,
   terminating the proposed change to the data element to prevent the proposed change from being made, including maintaining an unchanged value of the data element, wherein the updating the data element if all nodes acknowledge the invalidation otherwise terminating the proposed change prevents valid data from becoming inconsistent across the nodes,
   the updated or unchanged data element then being a current, valid value of the data element; and
   unlocking the data element after either updating the data element or terminating the proposed change to the data element to allow access to the data element.

2. The method of claim 1, wherein receiving the proposed change comprises:
   receiving the proposed change at a central management entity of the distributed system, and wherein sending the invalidation comprises sending the invalidation from the central management entity to the nodes of the distributed system.

3. The method of claim 1, wherein receiving the proposed change comprises:
receiving the proposed change at one node of the distributed system, and wherein sending the invalidation comprises sending the invalidation from the one node of the distributed system to the other nodes of the distributed system.

4. The method of claim 3, wherein the database is a replicated database, and wherein receiving the proposed change comprises receiving the proposed change at a data coordinator on the one node; and wherein sending the invalidation comprises sending the invalidation to the other nodes from the data coordinator of the one node.

5. The method of claim 1, wherein the distributed system comprises a cluster of caches, where each cache of the cluster is a node of the distributed system.

6. The method of claim 1, wherein locking the data element comprises one or more of listing the data element in a lock table, adding a lock bit to the data element, changing a value of a field of the data element to indicate the data element is locked, or modifying a state of a reference representing the data element.

7. The method of claim 1, wherein unlocking the data element comprises one or more of removing the data element from a lock table, removing a lock bit from the data element, changing a value of a field of the data element to indicate the data element is unlocked, or modifying a state of a reference representing the data element.

8. The method of claim 1, wherein sending the invalidation to the nodes comprises:
sending a request to each node to cause each node to mark a copy of the data element at the node as invalid, and cause the node to request the data element prior to subsequent access to the data element at the node.

9. The method of claim 1, wherein terminating the proposed change further comprises:
allowing the data element to remain invalid at any node that invalidated the data element, until the node requests a synchronization of the data element, instead of pushing a synchronization of the data element from the data coordinator.

10. The method of claim 1, further comprising:
receiving a request for the data element from a node that invalidated a local copy of the data element; and
sending the current value of the data element to the node.

11. An apparatus comprising:
a storage device that stores a distributed database in a distributed system, the distributed database to store a data element, the distributed system having a network of multiple nodes that store a copy of the data element, each node coupled to, and in communication with, the data coordinator; and
a data coordinator to
receive a request to modify the data element of the distributed system,
lock the data element at the device to prevent access to the data element in response to receiving the proposed change,
send, after locking the data element at the device, an invalidation of the data element to the nodes of the distributed system storing a copy of the data element to invalidate copies of the data element stored at the nodes,
receive by the device zero or more acknowledgements of the invalidation by the nodes storing a copy of the data element,
update the data element in accordance with the requested modification if all nodes in the distributed system storing a copy of the data element acknowledge the invalidation of the data element, otherwise, terminate the requested modification to the data element to prevent the proposed change from being made, including maintaining an unchanged value of the data element, wherein the updating the data element if all nodes acknowledge the invalidation otherwise terminating the proposed change prevents valid data from becoming inconsistent across the nodes, the updated or unchanged data element then being a current, valid value of the data element in the database, and
unlock the data element after either updating the data element or terminating the proposed change to the data element to make the data element available for access.

12. The apparatus of claim 11, wherein the apparatus comprises a central management entity of the distributed system, and wherein the data coordinator is to send the invalidation to cohort nodes of the distributed system.

13. The apparatus of claim 11, wherein the apparatus comprises one node of the distributed system, and wherein the data coordinator is to send the invalidation to the other nodes of the distributed system.

14. The apparatus of claim 11, wherein the distributed system comprises a cluster of cache devices, where each cache device of the cluster is a node of the distributed system.

15. The apparatus of claim 11, wherein the data coordinator is to send a request to each node to cause each node to mark a copy of the data element at the node as invalid, the request to cause the node to request the data element prior to subsequent use of the data element at the node.

16. The apparatus of claim 11, wherein the data coordinator is to terminate the proposed change, including allowing the data element to remain invalid at any node that invalidated the data element, until the node requests a synchronization of the data element, instead of pushing a synchronization of the data element.

17. The apparatus of claim 11, wherein the data coordinator further receives a request from a node that invalidated the data element for the data element, and sends the current value of the data element to the node.

18. An article of manufacture comprising a computer-readable storage medium having instructions stored thereon, which when executed, cause a processor to:
receive at a device incorporating a data coordinator a proposed change to a data element of a distributed system, the distributed system having multiple nodes storing a copy of the data element, each node coupled to, and in communication with, the data coordinator;
lock the data element at the device to prevent access to the data element in response to receiving the proposed change;
send, after locking the data element at the device, an invalidation of the data element to the nodes of the distributed system storing a copy of the data element to invalidate copies of the data element stored at the nodes;
receive by the device zero or more acknowledgements of the invalidation by the nodes storing a copy of the data element;

update the data element in accordance with the proposed change if all nodes in the distributed system storing a copy of the data element acknowledge the invalidation of the data element, otherwise, terminate the proposed change to the data element to prevent the proposed change from being made, including maintaining an unchanged value of the data element, wherein the updating the data element if all nodes acknowledge the invalidation otherwise terminating the proposed change prevents valid data from becoming inconsistent across the nodes, the updated or unchanged data element then being a current, valid value of the data element; and unlock the data element after either updating the data element or terminating the proposed change to the data element to allow access to the data element.

19. The article of manufacture of claim 18, wherein the instructions for receiving the proposed change comprises instructions for receiving the proposed change at one node of the distributed system, and wherein the instructions for sending the invalidation comprises instructions for sending the invalidation from the one node of the distributed system to the other nodes of the distributed system.

20. The article of manufacture of claim 19, wherein the database is a replicated database, and wherein the instructions for receiving the proposed change comprises instructions for receiving the proposed change at a data coordinator on the one node; and wherein the instructions for sending the invalidation comprises instructions for sending the invalidation to the other nodes from the data coordinator of the one node.

21. The article of manufacture of claim 18, wherein the instructions for sending the invalidation to the nodes comprises instructions for sending a request to each node to cause each node to mark a copy of the data element at the node as invalid, and cause the node to request the data element prior to subsequent access to the data element at the node.

22. The article of manufacture of claim 18, further comprising instructions for receiving a request from a node that invalidated the data element for the data element, and sending the current value of the data element to the node.

* * * * *